US012637177B2

(12) United States Patent
Inoue

(10) Patent No.: US 12,637,177 B2
(45) Date of Patent: May 26, 2026

(54) MARINE VESSEL RENTAL SYSTEM AND MARINE VESSEL RENTAL METHOD

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 416 days.

(21) Appl. No.: 18/100,012

(22) Filed: Jan. 23, 2023

(65) Prior Publication Data

US 2023/0278670 A1 Sep. 7, 2023

(30) Foreign Application Priority Data

Jan. 28, 2022 (JP) ................................ 2022-011647

(51) Int. Cl.
*B63B 17/00* (2006.01)
*G07B 15/02* (2011.01)
(Continued)

(52) U.S. Cl.
CPC .............. *B63B 17/00* (2013.01); *G07B 15/02* (2013.01); *G07C 9/00896* (2013.01); *G07C 9/215* (2020.01); *B63B 2017/0009* (2013.01)

(58) Field of Classification Search
CPC . B63B 17/00; B63B 2017/0009; G07B 15/02; G07C 9/00896; G07C 9/215; G06Q 10/02; G06Q 30/0645; G07F 17/0057
See application file for complete search history.

(56) References Cited

U.S. PATENT DOCUMENTS 10,442,399 B2 * 10/2019 Penilla ............... G07C 9/00309
2011/0112969 A1 5/2011 Zaid et al.
(Continued)

FOREIGN PATENT DOCUMENTS

JP 2013-095245 A 5/2013
JP 6782673 B2 11/2020
(Continued)

OTHER PUBLICATIONS

Horton, John J. & Zeckhauser, Richard J., 2016. "Owning, Using and Renting: Some Simple Economics of the "Sharing Economy"," Working Paper Series 16-007, Harvard University, John F. Kennedy School of Government. (Year: 2016).*
(Continued)

*Primary Examiner* — Sarah M Monfeldt
*Assistant Examiner* — Carlos F. Montalvo
(74) *Attorney, Agent, or Firm* — Keating & Bennett, LLP

(57) ABSTRACT

A marine vessel rental system that permits/prohibits starting of a driving source of a marine vessel in response to time and a marine vessel location includes a generator to generate an electronic key associated with information about a marine vessel for rent and information about a rental period in response to a request from a user terminal, and to transmit the information to the user terminal, a controller configured or programmed to permit starting of the driving source based on a condition that a current time belongs to the rental period corresponding to the electronic key, and an obtainer configured or programmed to obtain location information of the marine vessel. When the rental period corresponding to the electronic key has ended and the location information indicates that the marine vessel is located within a predetermined area, the controller is configured or programmed to prohibit the start of the driving source.

13 Claims, 6 Drawing Sheets

(51) Int. Cl.
*G07C 9/00* (2020.01)
*G07C 9/20* (2020.01)

(56) References Cited

U.S. PATENT DOCUMENTS

| | | | | |
|---|---|---|---|---|
| 2011/0153143 | A1* | 6/2011 | O'Neil | A01B 69/007 701/31.4 |
| 2011/0307375 | A1* | 12/2011 | Maney | B60R 25/00 701/2 |
| 2013/0117078 | A1* | 5/2013 | Weik, III | B60R 25/00 705/13 |
| 2014/0129053 | A1* | 5/2014 | Kleve | B60R 25/24 701/2 |
| 2016/0140649 | A1* | 5/2016 | Kleve | H04W 12/06 705/307 |
| 2017/0116804 | A1* | 4/2017 | Bae | G07C 9/25 |
| 2019/0122469 | A1 | 4/2019 | Fujiwara | |
| 2019/0205816 | A1* | 7/2019 | Sakurada | G07F 17/0057 |
| 2020/0180744 | A1* | 6/2020 | Gonring | G07C 9/00309 |
| 2021/0166303 | A1* | 6/2021 | Gideon, III | G06Q 20/145 |
| 2021/0312538 | A1 | 10/2021 | Inoue | |

FOREIGN PATENT DOCUMENTS

| | | | | |
|---|---|---|---|---|
| JP | 2021-099719 | A | 7/2021 | |
| JP | 2021-165970 | A | 10/2021 | |
| WO | WO-2006061550 | A1 * | 6/2006 | H04M 1/72463 |

OTHER PUBLICATIONS

Al-Bayari, O. and Sadoun, B. (2005), New centralized automatic vehicle location communications software system under GIS environment. Int. J. Commun. Syst., 18: 833-846. https://doi.org/10.1002/dac.734 (Year: 2005).*

Extended European Search Report in EP23153054.4, mailed Apr. 25, 2023, 8 pages.

* cited by examiner

MARINE VESSEL RENTAL SYSTEM AND MARINE VESSEL RENTAL METHOD

CROSS REFERENCE TO RELATED APPLICATIONS

This application claims the benefit of priority to Japanese Patent Application No. 2022-011647, filed on Jan. 28, 2022. The entire contents of this application are hereby incorporated herein by reference.

BACKGROUND OF THE INVENTION

1. Field of the Invention

The present invention relates to a marine vessel rental system and a marine vessel rental method to rent a marine vessel to a user.

2. Description of the Related Art

Conventionally, in order to improve convenience, a system that rents a marine vessel to a user without using a physical key has been proposed. For example, in Japanese Laid-Open Patent Publication (kokai) No. 2021-165970, an owner's marine vessel is able to be rented out to a user, and the user is able to borrow the owner's marine vessel by using a user terminal. As for starting an engine, which is a driving source of the owner's marine vessel, key locking is restricted while the owner's marine vessel is navigating within a predetermined distance away from shore, and the start of the engine is not prohibited. In addition, when an end signal is received from the user terminal, the key locking is performed and the start of the engine is prohibited.

However, a timing of receiving the end signal from the user terminal does not necessarily coincide with an end time of a rental period of the owner's marine vessel. There is room for improvement from the viewpoint of more appropriately permitting/prohibiting the start of the driving source of the owner's marine vessel in consideration of the relationship with the rental period.

SUMMARY OF THE INVENTION

Preferred embodiments of the present invention provide marine vessel rental systems and marine vessel rental methods that are each able to appropriately permit/prohibit starting of a driving source of a marine vessel in response to the time and the marine vessel's location.

According to a preferred embodiment of the present invention, a marine vessel rental system includes a generator configured or programmed to generate an electronic key associated with information about a marine vessel for rent and information about a rental period in response to a request from a user terminal, and to transmit the information to the user terminal, a controller configured or programmed to permit starting of a driving source of the marine vessel for rent based on a condition that a current time belongs to the rental period corresponding to the electronic key, and an obtainer configured or programmed to obtain location information of the marine vessel. In a case that the rental period corresponding to the electronic key has ended and the location information indicates that the marine vessel is located within a predetermined area, the controller is configured or programmed to prohibit the start of the driving source.

According to another preferred embodiment of the present invention, a marine vessel rental system includes a controller configured or programmed to permit starting of a driving source of a marine vessel for rent based on a condition that a current time belongs to a rental period corresponding to an electronic key associated with information about the marine vessel for rent and information about the rental period, which information is stored in a user terminal, and an obtainer configured or programmed to obtain location information of the marine vessel. In a case that the rental period corresponding to the electronic key has ended and the location information indicates that the marine vessel is located within a predetermined area, the controller is configured or programmed to prohibit the start of the driving source.

According to another preferred embodiment of the present invention, a marine vessel rental method carried out by at least one computer includes generating an electronic key associated with information about a marine vessel for rent and information about a rental period in response to a request from a user terminal, and transmitting the information to the user terminal, permitting starting of a driving source of the marine vessel for rent based on a condition that a current time belongs to the rental period corresponding to the electronic key, obtaining location information of the marine vessel, and in a case that the rental period corresponding to the electronic key has ended and the location information indicates that the marine vessel is located within a predetermined area, prohibiting the start of the driving source.

According to another preferred embodiment of the present invention, a marine vessel rental method carried out by at least one computer includes permitting starting of a driving source of a marine vessel for rent based on a condition that a current time belongs to a rental period corresponding to an electronic key associated with information about the marine vessel for rent and information about the rental period, the information being stored in a user terminal, obtaining location information of the marine vessel, and in a case that the rental period corresponding to the electronic key has ended and the location information indicates that the marine vessel is located within a predetermined area, prohibiting the start of the driving source.

According to a preferred embodiment of the present invention, in response to the request from the user terminal, the electronic key associated with the information about the marine vessel for rent and the information about the rental period, is generated and is transmitted to the user terminal. Based on the condition that the current time belongs to the rental period corresponding to the electronic key, the start of the driving source of the marine vessel for rent is permitted. The location information of the marine vessel is obtained. In the case that the rental period corresponding to the electronic key has ended and the location information indicates that the marine vessel is located within the predetermined area, the start of the driving source is prohibited.

For example, even in the case that the rental period corresponding to the electronic key has ended, if the marine vessel is located outside the predetermined area, the start of the driving source will not be prohibited. As a result, it is possible to appropriately permit/prohibit the start of the driving source of the marine vessel in response to the time and the marine vessel's location.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
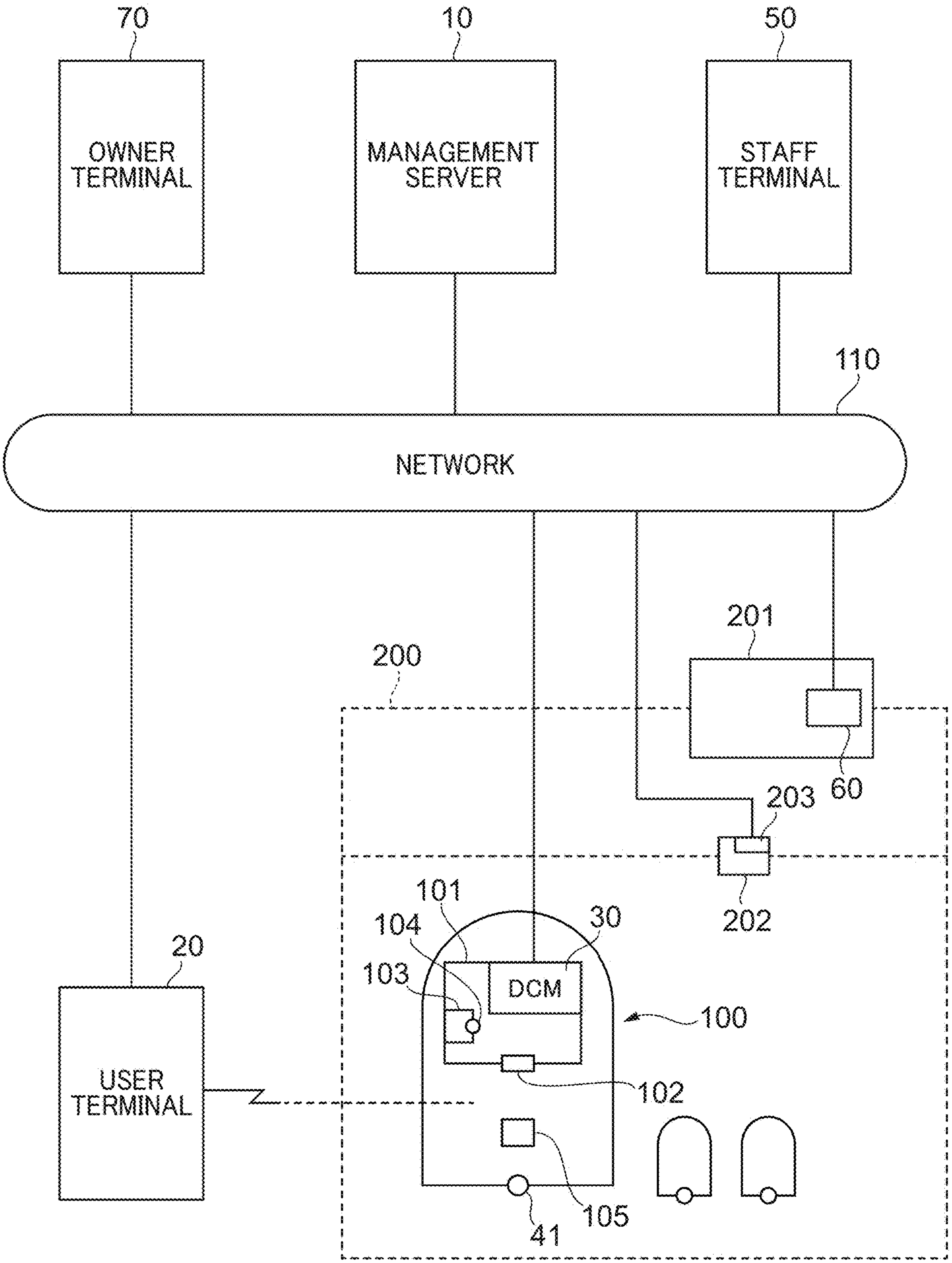
FIG. 1 is a diagram that shows an overall configuration of a marine vessel rental system according to a preferred embodiment of the present invention.

FIG. 1 is a diagram that shows an overall configuration of a marine vessel rental system according to a preferred embodiment of the present invention.

As one example, the marine vessel rental system of FIG. 1 is a system that rents an owner's marine vessel out to a user. Although there are a plurality of the owner's marine vessels which are rental targets, since all of the plurality of the owner's marine vessels that are the rental targets have the same configuration, a representative of the owner's marine vessels will be described with respect to a marine vessel 100. The marine vessel 100 includes a data communication module (DCM) 30 that performs wireless communications and various kinds of controls.

As shown in FIG. 1, the marine vessel rental system of FIG. 1 includes a management server 10, a user terminal 20, the DCM 30 of the marine vessel 100, a staff terminal 50, an unlocking processing unit 60, an unlocking processing unit 203, and an owner terminal 70, and respective components of the marine vessel rental system of FIG. 1 are able to communicate with each other via a network 110. The network 110 is, for example, a wireless communication network such as the Internet. The management server 10 is, for example, a cloud server.

The user terminal 20, the owner terminal 70, and the staff terminal 50 are communication terminal devices such as smartphones, but may be personal computers. The user terminal 20 is the communication terminal device possessed (operable) by a user who borrows the marine vessel 100. The owner terminal 70 is the communication terminal device possessed (operable) by an owner of the marine vessel 100. The staff terminal 50 is a predetermined terminal device different from the user terminal 20, and is possessed (operable) by a staff member who provides services such as the movement of the marine vessel 100 to be rented out and refueling of the marine vessel 100 to be rented out. Although one user terminal 20, one owner terminal 70, one staff terminal 50, and one management server 10 are shown in FIG. 1, the marine vessel rental system of FIG. 1 may include a plurality of the user terminals 20, a plurality of the owner terminals 70, a plurality of the staff terminals 50, and a plurality of the management servers 10.

A mooring space for the marine vessel 100 is included within a marina 200. Generally, the user who borrows the marine vessel 100 is able to pass through a marina gate 201 and enter the marina 200, and is able to pass through a pier gate 202 and access the marine vessel 100. The marina gate 201 and the pier gate 202 are generally locked.

The marina gate 201 is provided with the unlocking processing unit 60, and the pier gate 202 is also provided with the unlocking processing unit 203 same as the unlocking processing unit 60. The unlocking processing unit 60 and the unlocking processing unit 203 permit unlocking of the marina gate 201 and unlocking of the pier gate 202 to the user who satisfies a predetermined condition (described below) including authentication.

The marine vessel 100 includes a cabin 101. An unlocking processing unit 102 processes unlocking of the cabin 101, that is, processes permission/prohibition of entry into the cabin 101. In addition, an unlocking processing unit 104 processes unlocking of a storage compartment 103 within the cabin 101. Furthermore, an unlocking processing unit (not shown) processes unlocking of a hatch 105, and/or unlocking of a storage compartment (not shown) within the marine vessel 100. The marine vessel 100 includes a driving source 41 for navigating the marine vessel 100. The driving source 41 is, for example, an engine, but may be an electric motor.

Figure 2:
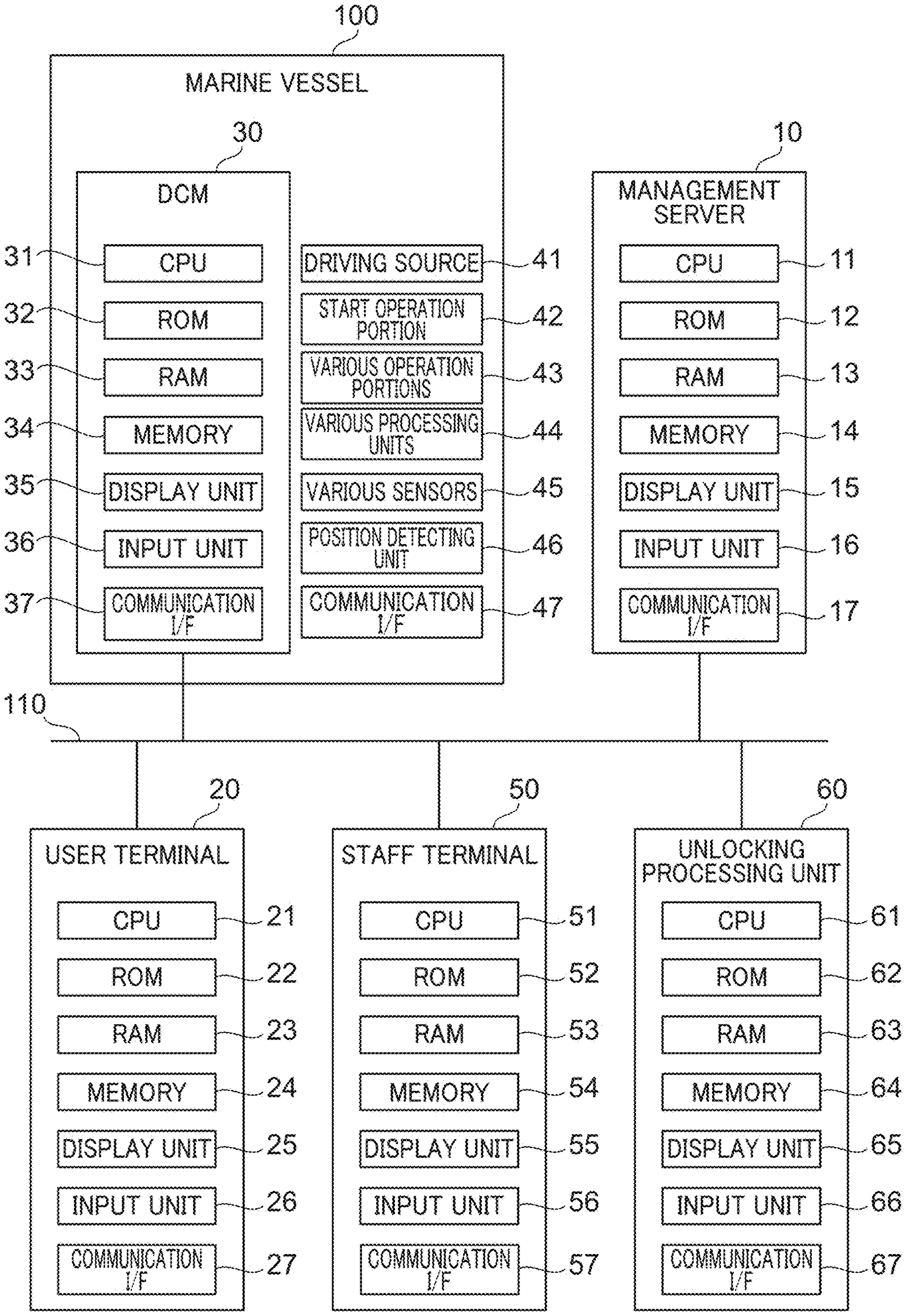
FIG. 2 is a block diagram of principal components of the marine vessel rental system of FIG. 1.

FIG. 2 is a block diagram of principal components of the marine vessel rental system of FIG. 1. In the marine vessel 100, the DCM 30 controls the entire marine vessel 100 including the driving source 41. The DCM 30 includes a CPU (Central Processing Unit) 31, a ROM (Read Only Memory) 32, a RAM (Random Access Memory) 33, a memory 34, a display unit 35, an input unit 36, a communication I/F (interface) 37, and a timer (not shown). The ROM 32 or the memory 34 stores control programs. The CPU 31 provides various kinds of control processes by loading the control programs, which are stored in the ROM 32 or the memory 34, into the RAM 33 and executing them. The RAM 33 provides a working area when the CPU 31 executes the control programs. The display unit 35 displays various kinds of information. The input unit 36 accepts inputting of setting values and modes from a marine vessel operator of the marine vessel 100. The communication I/F 37 is not only able to communicate with the network 110, but also able to communicate with an ECU (an engine control unit (not shown)) that controls the driving source 41 via a CAN (Control Area Network) or the like. The display unit 35 may have a simple configuration such as an LED (light emitting diode) display. Moreover, the input unit 36 is not essential.

The marine vessel 100 includes the DCM 30, the driving source 41, a start operation portion 42, various operation portions 43, various processing units 44, various sensors 45, a location detecting unit 46, and a communication I/F 47. The start operation portion 42 is a start switch or the like for inputting an instruction to start the driving source 41. When the driving source 41 is stopped and the start of the driving source 41 is permitted, the driving source 41 is started by appropriately operating the start operation portion 42. The various operation portions 43 include, for example, a steering wheel and a remote controller that are operated by the user to maneuver the marine vessel 100. The various operation portions 43 are also used by the user to input various kinds of settings.

The various processing units 44 include an ECU and process various kinds of operations related to the marine vessel 100. The various sensors 45 include sensors that detect operations of various operation portions 43. In addition, the various sensors 45 include an acceleration sensor, a speed sensor, an angular speed sensor, and the like (none of which are shown). The location detecting unit 46 receives GPS signals from GPS (Global Positioning System) satellites and outputs location information indicating the current location of the marine vessel 100. The communication I/F 47 is able to communicate with the communication I/F 37 of the DCM 30 via the CAN or the like.

The management server 10 includes a CPU 11, a ROM 12, a RAM 13, a memory 14, a display unit 15, an input unit 16, a communication I/F 17, and a timer (not shown). The CPU 11 provides various kinds of control processes by loading control programs, which are stored in the ROM 12 or the memory 14, into the RAM 13 and executing them. The RAM 13 provides a working area when the CPU 11 executes the control programs. The display unit 15 displays various kinds of information. The input unit 16 accepts inputting of various kinds of settings and instructions from an administrator of the management server 10. The memory 14 stores an application for realizing the marine vessel rental system (hereinafter, referred to as "a rental application") and related applications corresponding to the rental application. The communication I/F 17 is able to communicate with the network 110. In addition, in the process of performing a rental process, various kinds of information such as setting information, corresponding information (described below), the location information of the marine vessel 100, etc. are stored in the memory 14.

The user terminal 20 includes a CPU 21, a ROM 22, a RAM 23, a memory 24, a display unit 25, an input unit 26, a communication I/F 27, and a timer (not shown). The configurations of the CPU 21, the ROM 22, the RAM 23, the memory 24, and the display unit 25 are basically the same as the configurations of the CPU 11, the ROM 12, the RAM 13, the memory 14, and the display unit 15 of the management server 10. The input unit 26 accepts inputting of various kinds of settings and instructions from the user who possess the user terminal 20. The communication I/F 27 is able to communicate with the network 110. The communication I/F 27 also includes a short-range wireless communication function such as Bluetooth (registered trademark). In addition, the rental application downloaded from the management server 10 is stored in the memory 24.

The staff terminal 50 includes a CPU 51, a ROM 52, a RAM 53, a memory 54, a display unit 55, an input unit 56, a communication I/F 57, and a timer (not shown). The configurations of the CPU 51, the ROM 52, the RAM 53, the memory 54, the display unit 55, and the communication I/F 57 are basically the same as the configurations of the CPU 21, the ROM 22, the RAM 23, the memory 24, the display unit 25, and the communication I/F 27 of the user terminal 20. The input unit 56 accepts inputting of various kinds of settings and instructions from a user (the staff member) who possess the staff terminal 50. In addition, the related application for the staff downloaded from the management server 10 is stored in the memory 54.

The unlocking processing unit 60 includes a CPU 61, a ROM 62, a RAM 63, a memory 64, a display unit 65, an input unit 66, a communication I/F 67, and a timer (not shown). The configurations of the CPU 61, the ROM 62, the RAM 63, the memory 64, the display unit 65, and the communication I/F 67 are basically the same as the configurations of the CPU 21, the ROM 22, the RAM 23, the memory 24, the display unit 25, and the communication I/F 27 of the user terminal 20. The input unit 66 accepts inputting of various kinds of settings and instructions from a person who manages the unlocking processing unit 60 (for example, the above staff member). In addition, the related application for the unlocking process downloaded from the management server 10 is stored in the memory 64.

Although illustration is omitted, the configuration of the unlocking processing unit 203 is the same as that of the unlocking processing unit 60. Further, the configurations of the unlocking processing unit 102, the unlocking processing unit 104, and the unlocking processing unit (not shown) that processes the unlocking of the hatch 105, and/or the unlocking of the storage compartment within the marine vessel 100 may be the same as the configuration of the unlocking processing unit 203. However, these unlocking processing units may have a simple configuration in which communication functions with the CPU and the network 110 are omitted.

A plurality of communication functions may be included in the communication I/Fs 37, 47, 17, 27, and 57, and the methods of those communication functions may be wired or wireless. Also, all of the communication I/Fs 37, 47, 17, 27, and 57 may include communications with the network 110, or may include a short-range wireless communication function.

Figure 3:
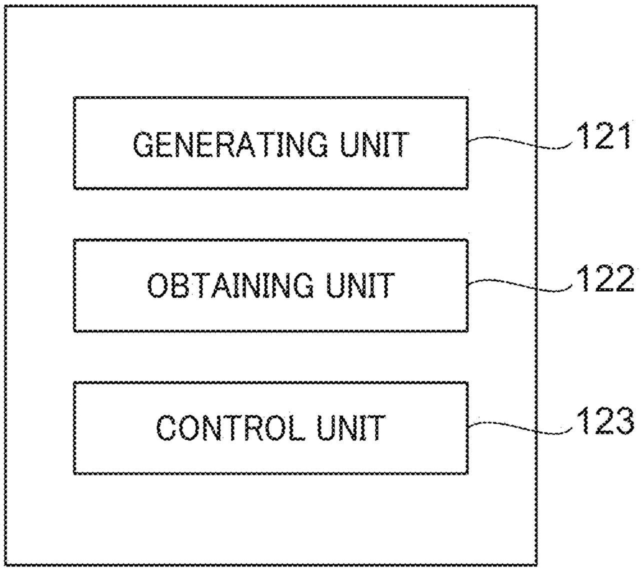
FIG. 3 is a diagram that shows a functional block of the marine vessel rental system of FIG. 1.

FIG. 3 is a diagram that shows a functional block of the marine vessel rental system of FIG. 1. The functional block includes at least one computer. The functional block includes a generating unit 121, an obtaining unit 122, and a control unit 123. Either or both of the DCM 30 and the management server 10 are assumed to be at least one computer including the functional block. Therefore, any one or all of the generating unit 121, the obtaining unit 122, and the control unit 123 include at least one of the DCM 30 and the management server 10. In a preferred embodiment of the present invention, as a representative example, the generating unit 121 includes the management server 10, and the obtaining unit 122 and the control unit 123 include the DCM 30.

It should be noted that functions of the obtaining unit 122 and the control unit 123 provided by the DCM 30 are mainly provided by cooperation of the CPU 31, the ROM 32, the RAM 33, the memory 34, the communication I/F 37 (see FIG. 2), etc. In the case that the marine vessel 100 is rented out, an application program for the DCM 30, which corresponds to the rental application, is downloaded to the memory 34 and is installed in the DCM 30. The functions of the obtaining unit 122 and the control unit 123 are provided by the CPU 31 executing the application program.

It should be noted that a function of the generating unit 121 provided by the management server 10 is mainly provided by cooperation of the CPU 11, the ROM 12, the RAM 13, the memory 14, the communication I/F 17 (see FIG. 2), etc. A software program for the management server 10, which corresponds to the rental application, is stored in the memory 14. The function of the generating unit 121 is provided by the CPU 11 executing the software program.

In response to a request from the user terminal 20, the generating unit 121 generates an electronic key, which is associated with information about the marine vessel 100 as the rental target, information about a rental period, etc. The information about the marine vessel 100 as the rental target, the information about the rental period, and information about the corresponding marina are referred to as "the corresponding information". The corresponding marina is the marina where the marine vessel 100 as the rental target is moored. The electronic key includes an ID (identification) or the like for linking to the corresponding information. The corresponding information is stored in the memory 14 of the management server 10. The generating unit 121 further associates the generated electronic key with the corresponding information and transmits it to the user terminal 20 being a request source. The electronic key received by the user terminal 20 is associated with the corresponding information by the ID and is stored in the memory 24 of the user terminal 20.

The obtaining unit 122 obtains the location information of the marine vessel 100. For example, the obtaining unit 122 obtains the location information of the marine vessel 100, which is outputted from the location detecting unit 46, by receiving it through the communication I/F 37.

The control unit 123 executes a control to permit or prohibit the start of the driving source 41 (see FIG. 2). For example, the control unit 123 permits the start of the driving source 41 of the marine vessel 100 as the rental target based on a condition that the current time belongs to the rental period corresponding to the electronic key. In addition, in the case that the rental period corresponding to the electronic key has ended and the location information indicates that the marine vessel 100 is located within a predetermined area, the control unit 123 prohibits the start of the driving source 41. The predetermined area referred to here is, for example, the inside of the marina 200 (inside the marina gate 201) or the inside of the pier (inside the pier gate 202).

In a state in which the start of the driving source 41 is prohibited, the driving source 41 will not newly be started even in the case that the start operation portion 42 is operated. However, even in the case that the start of the driving source 41 is prohibited while the driving source 41 is in operation, the driving source 41 will not forcibly be stopped at the same time.

Next, with reference to FIGS. 4 to 6, the process from applying for a marine vessel rental reservation to renting out a marine vessel will be described.

The owner registers in advance the marine vessel he/she wishes to rent out to the management server 10 from the owner terminal 70 or his/her own personal computer. The management server 10 manages marine vessels that are able to be rented out.

The user who wants to rent a marine vessel downloads and installs the rental application to the user terminal 20 in advance. It should be noted that the staff terminal 50, the unlocking processing unit 60, the unlocking processing unit 203, the owner terminal 70, etc. are also installed with necessary related applications in advance.

The user applies for a marine vessel rental reservation from the user terminal 20 or his/her own personal computer. Reception and processing of the marine vessel rental reservation are executed, for example, by the management server 10, but may be executed by another computer. At the reservation stage, the user is required to specify the marine vessel he/she wants to rent, the period he/she wants to rent (the rental period), etc. Also, it is necessary to register the destination of the electronic key (here, information that uniquely identifies the user terminal 20).

It should be noted that the information required at the registration stage of the marine vessel the owner wishes to rent out and at the reservation stage may include information disclosed in Japanese Laid-Open Patent Publication (kokai) No. 2021-165970.

Figure 4:
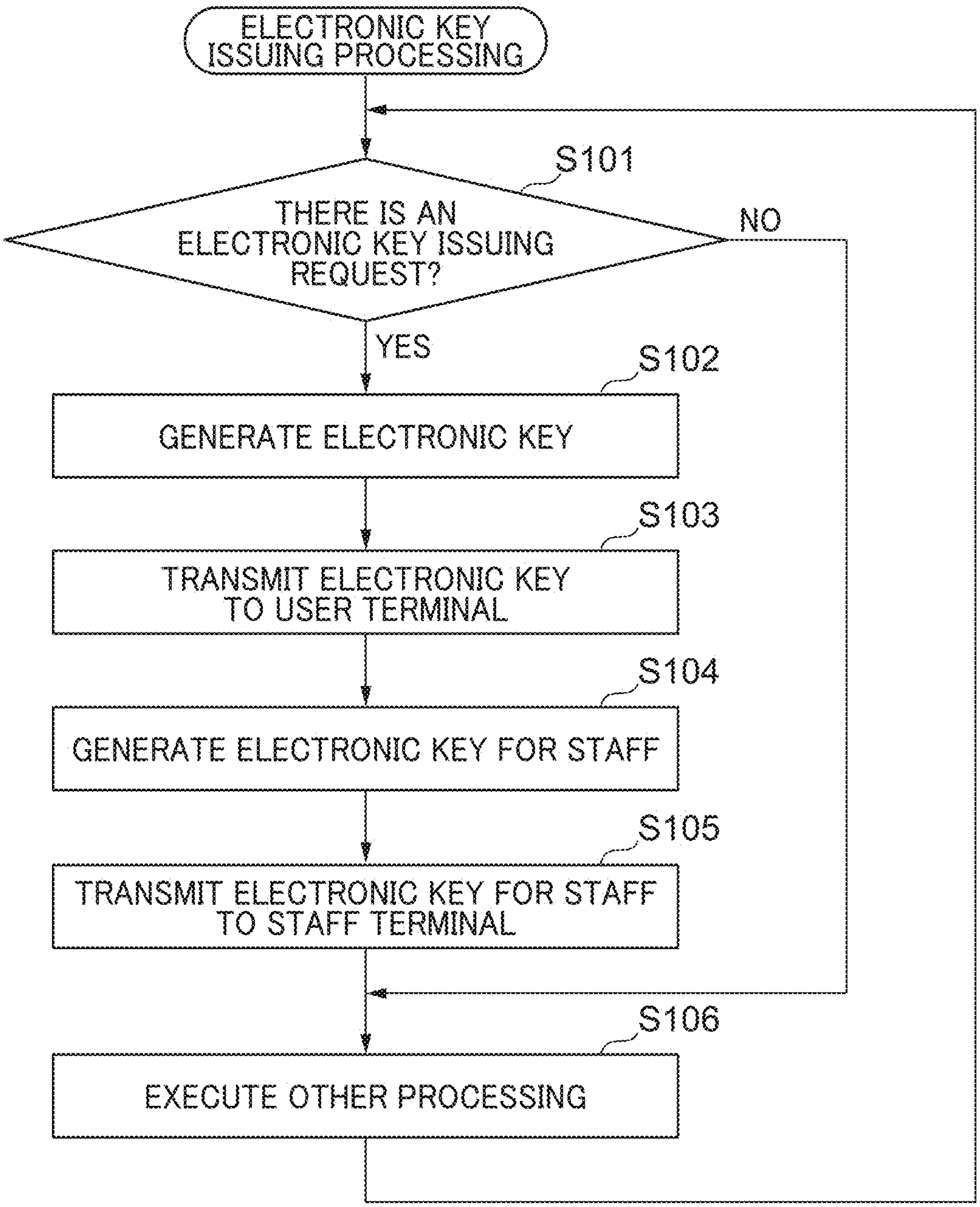
FIG. 4 is a flowchart that shows an electronic key issuing process.

FIG. 4 is a flowchart that shows an electronic key issuing process. The electronic key issuing process is provided by the CPU 11 of the management server 10 loading the program stored in the ROM 12 or the memory 14 into the RAM 13 and executing it.

As shown in FIG. 4, first, in step S101, the CPU 11 of the management server 10 determines whether or not there is an electronic key issuing request. When the marine vessel rental reservation is completed, the electronic key issuing request is generated. In the case that there is no already generated electronic key issuing request, the CPU 11 determines that there is no electronic key issuing request, and the electronic key issuing process proceeds to step S106. On the other hand, in the case that there is the already generated electronic key issuing request, the CPU 11 determines that there is the electronic key issuing request, and the electronic key issuing process proceeds to step S102.

In step S102, the CPU 11 generates an electronic key corresponding to the electronic key issuing request. At that time, the CPU 11 also generates corresponding information and an ID linked to the corresponding information. The CPU 11 associates the corresponding information with the electronic key and includes the ID in the electronic key. The electronic key and the corresponding information are stored in the memory 14.

In step S103, the CPU 11 makes a reservation to transmit the generated electronic key (including the ID) to the user terminal 20 as the request source. It should be noted that the generated electronic key (including the ID) may be transmitted immediately to the user terminal 20 as the request source. However, it is not essential and it is sufficient if the generated electronic key (including the ID) is transmitted to the user terminal 20 as the request source before the process of renting out the marine vessel begins. Therefore, the process executed in step S103 may be a transmission reservation for transmission at a designated transmission timing. The generated electronic key (including the ID) is transmitted to the user terminal 20 at a reserved transmission timing and is stored in the memory 24 of the user terminal 20.

In step S104, the CPU 11 generates an electronic key for the staff (another electronic key), which restricts use of some of the functions of the marine vessel 100, corresponding to the electronic key for the user transmitted to the user terminal 20. In step S105, the CPU 11 makes a reservation to transmit the generated electronic key for the staff to the staff terminal 50. The generated electronic key for the staff is transmitted to the staff terminal 50 at a reserved transmission timing and is stored in the memory 54 of the staff terminal 50.

The electronic key for the staff is a key that temporarily permits the start of the driving source 41 and maneuvering of the marine vessel 100 in order to allow the staff member to perform various kinds of works such as temporarily moving the marine vessel 100 and refueling of the marine vessel 100. By causing the staff terminal 50 to receive the electronic key for the staff, the management server 10 is able to permit the staff member to perform various kinds of works without handing over a master key of the marine vessel 100 to the staff member. It should be noted that the maximum output of the driving source 41 when the driving source 41 is started by using the electronic key for the staff may be limited to a predetermined output.

It should be noted that a time of generating the electronic key for the staff may be the same as the time of generating the electronic key for the user, or may be earlier than the time of generating the electronic key for the user. In addition, it is sufficient if the electronic key for the staff is transmitted to the staff terminal 50 before renting out the marine vessel begins, and the time of transmitting the electronic key for the staff may be before, after, or at the same time as the time of transmitting the electronic key for the user to the user terminal 20. Moreover, it is not essential that the time of generating and the time of transmitting the electronic key for the staff depend on the time of generating and the time of transmitting the electronic key for the user. For example, the electronic key for the staff may be generated and transmitted in response to a request from the owner. It should be noted that the destination of the electronic key for the staff may be the staff terminal 50 possessed by at least one staff member in charge of providing services of the marine vessel 100, or may be a plurality of staff terminals 50.

In step S106, the CPU 11 executes one other process. In the other process, for example, the CPU 11 makes a reservation to transmit the corresponding information corresponding to the electronic key generated in step S102 to the DCM 30, the unlocking processing unit 60, and the unlocking processing unit 203. In addition, it is sufficient if the corresponding information is transmitted to the DCM 30, the unlocking processing unit 60, and the unlocking processing unit 203 before renting out the marine vessel begins, and a time of transmitting the corresponding information to the DCM 30, the unlocking processing unit 60, and the unlocking processing unit 203 may be before, after, or at the same time as the time of transmitting the electronic key for the user to the user terminal 20. It should be noted that the corresponding information may be transmitted in response to a request at a point in time when the corresponding information becomes necessary for processing in the DCM 30, the unlocking processing unit 60, and the unlocking processing unit 203. The corresponding information is stored in the memory 34 of the DCM 30, the memory 64 of the unlocking processing unit 60, and a memory (not shown) of the unlocking processing unit 203.

In addition, in the other process, the CPU 11 may execute an electronic key regeneration process and an electronic key retransmission process due to changes in rental conditions (such as a change in the rental target and a change in the rental period), and/or a cancellation process. After step S106, the CPU 11 returns the electronic key issuing process to step S101.

Figure 5:
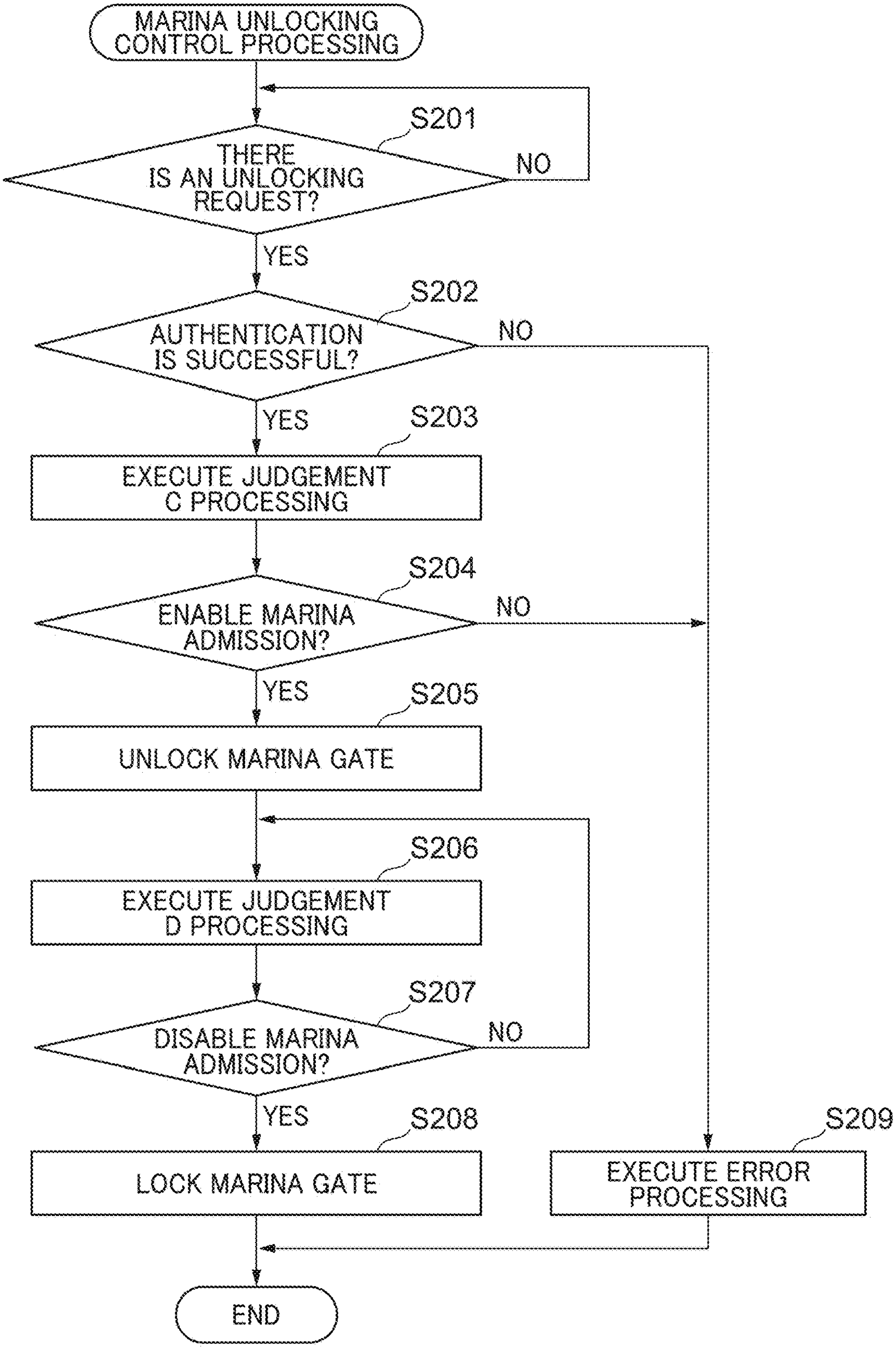
FIG. 5 is a flowchart that shows a marina unlocking control process.

FIG. 5 is a flowchart that shows a marina unlocking control process. The marina unlocking control process is provided by the CPU 61 of the unlocking processing unit 60 of the marina gate 201 loading the program stored in the ROM 62 or the memory 64 into the RAM 63 and executing it.

In the marina unlocking control process, it is assumed that the user who has completed the marine vessel rental reservation goes to the marina 200 and tries to pass through the marina gate 201 in order to borrow the marine vessel 100. The electronic key is already stored in the user terminal 20.

As shown in FIG. 5, in step S201, the CPU 61 waits until an unlocking request to request the unlocking of the marina gate 201 is received. Here, the user is able to issue the unlocking request by launching the rental application on the user terminal 20 and pressing a marina gate unlocking request button (not shown) displayed on the rental application displayed on the display unit 25 of the user terminal 20. The electronic key is also transmitted at the same time with the unlocking request. The issued unlocking request is transmitted to the unlocking processing unit 60 via the network 110. Alternatively, the issued unlocking request may be transmitted to the unlocking processing unit 60 by short-range wireless communication. Upon receiving the unlocking request, the CPU 61 advances the marina unlocking control process to step S202.

In step S202, the CPU 61 executes an authentication process of the user terminal 20 that is a transmission source of the unlocking request, and determines whether or not the authentication of the user terminal 20 is successful (the authentication of the user terminal 20 is OK). Here, for example, the CPU 61 performs the authentication of the user terminal 20 based on whether or not the corresponding information linked to the ID included in the electronic key received at the same time with the unlocking request is stored in the memory 64. In the case that the corresponding information linked to the ID is not stored in the memory 64, the CPU 61 determines that the authentication of the user terminal 20 has failed, and advances the marina unlocking control process to step S209. In step S209, the CPU 61 executes an error process and ends the marina unlocking control process shown in FIG. 5. In the error process, for example, the fact that the authentication of the user terminal 20 has failed is notified by a display or a voice.

On the other hand, in the case that the corresponding information linked to the ID is stored in the memory 64, the CPU 61 determines that the authentication of the user terminal 20 is successful, and advances the marina unlocking control process to step S203. After step S203, the CPU 61 permits or prohibits the unlocking of the marina gate 201 based on the rental period and the current time.

Here, "the rental period" is defined. The rental period in "the corresponding information" is not "a reservation rental period" but "a substantial rental period". The reservation rental period is the period specified by the user at the stage of applying for the marine vessel rental reservation, and is the period recognized by the user as the rental period. On the other hand, the substantial rental period is a period during which it is possible to actually permit the start of the driving source 41.

The substantial rental period is a period from a time point that is before a start time of the reservation rental period by a first margin time to a time point that is after an end time of the reservation rental period by a second margin time. For example, in the case that the reservation rental period is 10:00 to 15:00, and both the first margin time and the second margin time are 5 minutes, the substantial rental period becomes 9:55 to 15:05.

It should be noted that either or both of the first margin time and the second margin time may be zero. Therefore, the start time of the reservation rental period and a start time of the substantial rental period may coincide. Alternatively, the end time of the reservation rental period and an end time of the substantial rental period may coincide.

Figure 6:
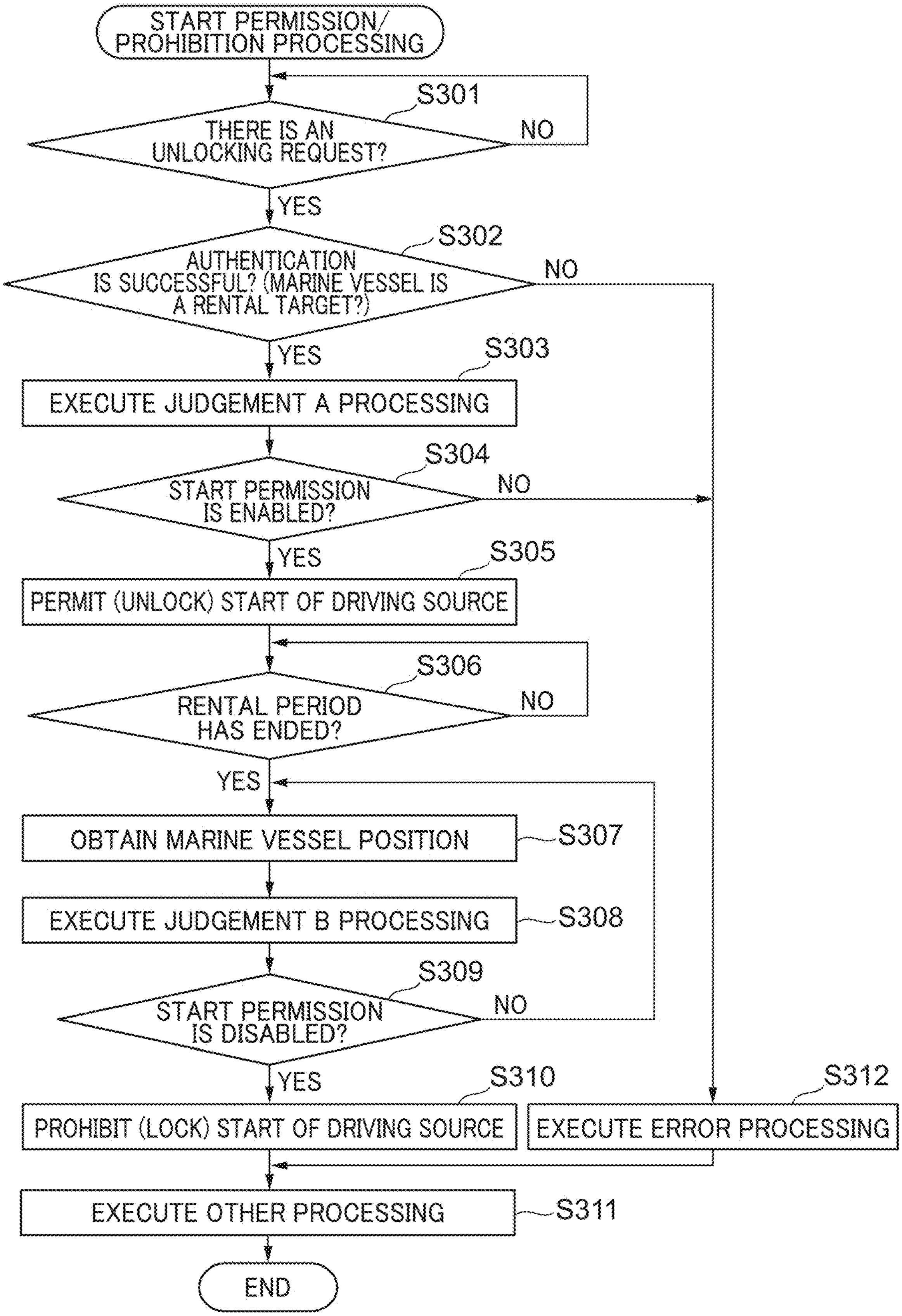
FIG. 6 is a flowchart that shows a start permission/prohibition process.

"The rental period" that appears in the description of FIGS. 4 to 6 after the marine vessel rental reservation is completed is the substantial rental period. Henceforth, unless otherwise specified, the rental period refers to the substantial rental period.

In step S203, the CPU 61 executes a judgment C process. In the judgment C process, first, the CPU 61 obtains the current time. Then, the CPU 61 determines whether or not the current time belongs to a period from a time point that is before the start time of the rental period by a predetermined time T1 (for example, one hour) to a time point that is after the end time of the rental period by a predetermined time T2 (for example, one hour).

The reason why the predetermined time T1 and the predetermined time T2 are provided is that sometimes the user wants to enter and leave the marina 200 before and after the period during which it is possible to borrow the marine vessel 100. It should be noted that values of the predetermined time T1 and the predetermined time T2 are not limited to one hour exemplified. In addition, either or both of the predetermined time T1 and the predetermined time T2 may be zero.

In step S204, the CPU 61 determines whether or not to enable marina admission (marina entry) based on the result of the judgment C process. That is, in the case that the current time belongs to the period from the time point that is before the start time of the rental period by the predetermined time T1 to the time point that is after the end time of the rental period by the predetermined time T2, the CPU 61 determines to enable the marina admission (determines that the marina admission is enabled). On the other hand, in the case that the current time does not belong to the period from the time point that is before the start time of the rental period by the predetermined time T1 to the time point that is after the end time of the rental period by the predetermined time T2, the CPU 61 determines to disable the marina admission (determines that the marina admission is disabled).

In the case it is determined that the marina admission is disabled, the CPU 61 executes the error process in step S209, and ends the marina unlocking control process shown in FIG. 5. In this case, the unlocking of the marina gate 201 is prohibited. In the error process here, for example, the fact that the marina admission is disabled (permission of the marina admission has failed) is notified by a display or a voice.

On the other hand, in the case it is determined that the marina admission is enabled, the CPU 61 advances the marina unlocking control process to step S205, and permits the unlocking of the marina gate 201. After permitting the unlocking of the marina gate 201, when the user performs an unlocking operation, the CPU 61 unlocks the marina gate 201. It should be noted that after permitting the unlocking of the marina gate 201, the CPU 61 may unlock the marina gate 201 in response to the unlocking operation performed by the user within a certain period of time. Alternatively, after permitting the unlocking of the marina gate 201, the CPU 61 may automatically and temporarily unlock the marina gate 201 even in the case that there is no the unlocking operation performed by the user. When the marina gate 201 is unlocked, the user is able to pass through the marina gate 201.

In step S206, the CPU 61 executes a judgment D process. In the judgment D process, first, the CPU 61 obtains the current time. Then, the CPU 61 determines whether or not the current time has passed the time point that is after the end time of the rental period by the predetermined time T2.

In step S207, the CPU 61 determines whether to continue to enable the marina admission or to disable the marina admission based on the result of the judgment D process. That is, the CPU 61 determines to continue to enable the marina admission until the current time passes the time point that is after the end time of the rental period by the predetermined time T2, and returns the marina unlocking control process to step S206. Therefore, the user is able to enter and leave the marina 200 during this period.

However, when the current time has passed the time point that is after the end time of the rental period by the predetermined time T2, the CPU 61 determines to disable the marina admission (determines that the marina admission is disabled), and advances the marina unlocking control processing to step S208. That is, when the current time no longer belongs to the period from the time point that is before the start time of the rental period by the predetermined time T1 to the time point that is after the end time of the rental period by the predetermined time T2, the marina admission is determined to be disabled.

In step S208, the CPU 61 prohibits the unlocking of the marina gate 201, that is, the CPU 61 locks the marina gate 201. Therefore, even if the user performs the unlocking operation, the user is not able to unlock the marina gate 201 and is not able to pass through the marina gate 201. After step S208, the CPU 61 ends the marina unlocking control process shown in FIG. 5.

According to the marina unlocking control process shown in FIG. 5, the unlocking of the marina gate 201 is permitted from the time point that is before the start time of the rental period by the predetermined time T1. In addition, after the unlocking of the marina gate 201 is permitted, the unlocking permission of the marina gate 201 is continued until the time point that is after the end time of the rental period by the predetermined time T2 passes, and after the time point that is after the end time of the rental period by the predetermined time T2 has passed, automatically returning to the locked state of the marina gate 201.

It should be noted that an unlocking control process that permits/prohibits the unlocking of the pier gate 202 when the user tries to pass through the pier gate 202 is executed by the unlocking processing unit 203 in the same manner as the marina unlocking control process shown in FIG. 5.

In addition, the electronic key is associated with a function that requests the unlocking of the cabin 101, the unlocking of the storage compartment 103, the unlocking of the hatch 105, the unlocking of the storage compartment within the marine vessel 100, and/or unlocking of a storage compartment (not shown) within the marina 200. A plurality of processes that permit/prohibit the unlocking of the cabin 101, the unlocking of the storage compartment 103, the unlocking of the hatch 105, and the unlocking of other storage compartments (the storage compartment within the marine vessel 100 and the storage compartment within the marina 200) may also be executed by the unlocking processing unit 102, the unlocking processing unit 104, the unlocking processing unit (not shown), and the like in the same manner as the marina unlocking control process shown in FIG. 5. Moreover, from the viewpoint of simplifying the configuration, the unlocking of the cabin 101, the unlocking of the storage compartment 103, the unlocking of the hatch 105, and the unlocking of other storage compartments (the storage compartment within the marine vessel 100 and the storage compartment within the marina 200) may be permitted when communications are established by short-range wireless communication.

FIG. 6 is a flowchart that shows a start permission/prohibition process. The start permission/prohibition process is provided by the CPU 31 of the DCM 30 loading the program stored in the ROM 32 or the memory 34 into the RAM 33 and executing it. The start permission/prohibition process is started, for example, ten minutes before the start time of the rental period corresponding to the marine vessel 100.

As shown in FIG. 6, in step S301, the CPU 31 waits until an unlocking request (a start permission request) to request a start permission of the driving source 41 is received. Here, the user is able to issue the unlocking request (the start permission request) by launching the rental application on the user terminal 20 and pressing a start unlocking request button (not shown) displayed on the rental application displayed on the display unit 25 of the user terminal 20. The electronic key is also transmitted at the same time with the unlocking request (the start permission request). The issued unlocking request (the issued start permission request) is transmitted to the DCM 30 via the network 110. Alternatively, the issued unlocking request (the issued start permission request) may be transmitted to the DCM 30 by short-range wireless communication. Upon receiving the unlocking request (the start permission request) to request the start permission of the driving source 41, and the electronic key, the CPU 31 advances the start permission/prohibition process to step S302.

In step S302, the CPU 31 executes an authentication process of the user terminal 20 that is a transmission source of the unlocking request (the start permission request), and determines whether or not the authentication of the user terminal 20 is successful (the authentication of the user terminal 20 is OK). Here, for example, the CPU 31 refers to the corresponding information corresponding to the ID included in the received electronic key, and determines whether or not the marine vessel 100 in the corresponding information matches the marine vessel 100 corresponding to the CPU 31. Alternatively, the CPU 31 may determine whether or not the marine vessel 100 corresponding to the CPU 31 is the rental target based on whether or not the ID included in the received electronic key has been registered.

In the case that the marine vessel 100 corresponding to the CPU 31 is not the rental target, the CPU 31 determines that the authentication of the user terminal 20 has failed, and advances the start permission/prohibition process to step S312. In step S312, the CPU 31 executes an error process, and advances the start permission/prohibition process to step S311. In the error process, for example, the fact that the authentication of the user terminal 20 has failed is notified by a display or a voice.

On the other hand, in the case that the marine vessel 100 corresponding to the CPU 31 is the rental target, the CPU 31 determines that the authentication of the user terminal 20 is successful, and advances the start permission/prohibition process to step S303. After step S303, the CPU 31 permits or prohibits the start of the driving source 41 based on the rental period, the current time, and the current location of the marine vessel 100.

In step S303, the CPU 31 executes a judgment A process. In the judgment A process, the CPU 31 obtains the current time, and determines whether or not the current time belongs to the rental period in the corresponding information corresponding to the ID included in the received electronic key. In step S304, the CPU 31 determines whether or not the start permission of the driving source 41 is enabled based on the result of the judgment A process. That is, in the case that the current time does not belong to the rental period, the CPU 31 determines that the start permission of the driving source 41 is disabled, and advances the start permission/prohibition process to step S312. On the other hand, in the case that the current time belongs to the rental period, the CPU 31 determines that the start permission of the driving source 41 is enabled, and advances the start permission/prohibition process to step S305. Therefore, in order to permit the start of the driving source 41 for the first time, it is a condition that the current time belongs to the rental period.

In step S305, the CPU 31 permits (unlocks) the start of the driving source 41. Thereby, the user is able to start the driving source 41 by operating the start operation portion 42. After that, the user usually maneuvers the marine vessel 100 as the rental target, and the marine vessel 100 as the rental target returns to the port before the rental period has ended. However, it is conceivable that the rental period ends due to a delay in returning-to-port of the marine vessel 100 as the rental target.

In step S306, the CPU 31 obtains the current time, and waits until the rental period ends (the current time passes the end time of the rental period). This judgment (the process performed in step S306) is repeatedly executed at regular time intervals. When the rental period ends, the CPU 31 advances the start permission/prohibition process to step S307, and obtains the location information indicating the current location of the marine vessel 100 (hereinafter, referred to as "a marine vessel location").

In step S308, the CPU 31 executes a judgment B process. In the judgment B process, the CPU 31 determines whether or not the obtained marine vessel location is within the predetermined area. In step S309, the CPU 31 determines whether the start permission of the driving source 41 is enabled or disabled based on the result of the judgment B process. That is, in the case that the location information of the marine vessel 100 indicates that the marine vessel 100 is within the predetermined area, the CPU 31 determines that the start permission of the driving source 41 is disabled. On the other hand, in the case that the location information of the marine vessel 100 indicates that the marine vessel 100 is not within the predetermined area, the CPU 31 determines that the start permission of the driving source 41 is enabled.

In the case it is determined that the start permission of the driving source 41 is enabled, the CPU 31 returns the start permission/prohibition process to step S307. Therefore, after the start of the driving source 41 is permitted, even in the case that the rental period has ended, the start permission of the driving source 41 is continued when the marine vessel 100 is located outside the predetermined area.

On the other hand, in the case it is determined that the start permission of the driving source 41 is disabled, since the rental period has ended and the marine vessel 100 is located within the predetermined area, the CPU 31 advances the start permission/prohibition process to step S310. In step S310, the CPU 31 prohibits (locks) the start of the driving source 41. As a result, a new start of the driving source 41 is prohibited. Therefore, when the driving source 41 is stopped in this state, the driving source 41 cannot be started again.

In step S311, the CPU 31 executes an other process, and ends the start permission/prohibition process shown in FIG. 6. In the other process referred to here, for example, when the user terminal 20 notifies the CPU 31 that the use of the marine vessel 100 has ended, the CPU 31 may end the start permission/prohibition process shown in FIG. 6.

According to a preferred embodiment of the present invention, the management server 10 generates the electronic key in response to the request from the user terminal 20 and transmits it to the user terminal 20 (step S102 and step S103). The DCM 30 permits the start of the driving source 41 based on a the condition that the current time belongs to the rental period corresponding to the electronic key (step S305). In the case that the rental period has ended and the location information of the marine vessel 100 indicates that the marine vessel 100 is located within the predetermined area, the DCM 30 prohibits the start of the driving source 41 (step S310). As a result, it is possible to appropriately permit/prohibit the start of the driving source 41 in response to the time, and the location of the marine vessel 100.

Therefore, it is not necessary to share entrance codes for the marina gate 201 and the pier gate 202 with a large number of unspecified users, and to hand over the master key of the marine vessel 100 to a large number of unspecified users. In addition, the owner of the marine vessel 100 does not need to be present when renting out the marine vessel 100. It is also possible to be applied to a sharing service for renting out personal marine vessels.

Furthermore, after the start of the driving source 41 is permitted, even in the case that the rental period has ended, the start permission of the driving source 41 is continued when the marine vessel 100 is located outside the predetermined area (NO in step S309). As a result, it is possible to avoid a situation in which the driving source 41 cannot be restarted while the marine vessel 100 has not returned to the port.

In addition, in response to receiving the unlocking request for the marina gate 201 or the pier gate 202 from the user terminal 20, the unlocking of the marina gate 201 or the pier gate 202 is permitted/prohibited based on the rental period corresponding to the electronic key. As a result, it is also possible to appropriately unlock the marina gate 201 and the pier gate 202 in response to the time.

In addition, the unlocking of the marina gate 201 is permitted from the time point that is before the start time of the rental period by the predetermined time T1, and the marina gate 201 is locked after the time point that is after the end time of the rental period by the predetermined time T2 has passed. As a result, the user is free to enter and leave the marina 200 even before and after the rental period, which enhances convenience.

In addition, since the electronic key for the staff is transmitted to the staff terminal 50 in correspondence with the electronic key, the staff member is able to smoothly perform work and services related to marine vessel rental. Moreover, since the maximum output of the driving source 41 when the driving source 41 is started by using the electronic key for the staff is limited to the predetermined output, improper use of the marine vessel 100 by the staff member can be avoided.

By the way, there is a possibility that after the start of the driving source 41 is prohibited (locked), the marine vessel 100 moves out of the predetermined area again before the driving source 41 stops. Therefore, the configuration may be as follows.

First, in the judgment B process (step S308), the CPU 31 may determine whether or not the driving source 41 has stopped in addition to whether or not the marine vessel location is within the predetermined area. In step S309 in this case, in the case that the location information of the marine vessel 100 indicates that the marine vessel 100 is within the predetermined area and the driving source 41 has stopped, the CPU 31 determines that the start permission of the driving source 41 is disabled. On the other hand, in the case that the location information of the marine vessel 100 indicates that the marine vessel 100 is not within the predetermined area, or in the case that the driving source 41 is in operation, the CPU 31 determines that the start permission of the driving source 41 is enabled.

That is, even in the case that the rental period has ended and the location information of the marine vessel 100 indicates that the marine vessel 100 is located within the predetermined area, the CPU 31 may not prohibit the start of the driving source 41 until the operation of the driving source 41 stops (may permit the start of the driving source 41 until the operation of the driving source 41 stops). As a result, in the case that the marine vessel 100 moves out of the predetermined area again while the operation of the driving source 41 is continued after the rental period has ended, it is possible to restart the driving source 41.

Alternatively, in the other process (step S311), the CPU 31 continues to obtain the location information of the marine vessel 100, and when the marine vessel 100 moves out of the predetermined area again, the CPU 31 may permit (unlock) the start of the driving source 41 and return the start permission/prohibition process shown in FIG. 6 to step S307. As a result, even in the case that the start of the driving source 41 is once prohibited, when the marine vessel 100 moves out of the predetermined area while the driving source 41 is in operation, the start of the driving source 41 is permitted again.

It should be noted that the location information of the marine vessel 100 is obtained in step S307, that is, the location information of the marine vessel 100 is obtained when the rental period corresponding to the electronic key has ended. However, the time of obtaining the location information of the marine vessel 100 is not limited to this example, and the time of obtaining the location information of the marine vessel 100 may be started after the start permission/prohibition process (FIG. 6) is started and before step S308.

It should be noted that in the start permission/prohibition process (FIG. 6), when receiving the start permission request (the unlocking request) for the driving source 41 from the user terminal 20, the start of the driving source 41 is permitted if the current time belongs to the rental period. However, without being limited to this, the start of the driving source 41 may be permitted when the current time belongs to the rental period regardless of access from the user terminal 20.

It should be noted that the time of obtaining (the time of transmission) of the corresponding information corresponding to the electronic key is not limited to the transmission time described above. For example, the corresponding information corresponding to the electronic key may be transmitted from the management server 10 to the request source in response to a request from the DCM 30, the staff terminal 50, the unlocking processing unit 60, or the unlocking processing unit 203.

It should be noted that the functions of the obtaining unit 122 and the control unit 123 described with reference to FIG. 3 may be provided by the management server 10. In this case, the management server 10 receives an instruction from the DCM 30 and starts the start permission/prohibition process (FIG. 6). Further, the management server 10 obtains the location information from the DCM 30 in step S307. Moreover, in step S305, the management server 10 may cause the DCM 30 to perform a process to permit the start of the driving source 41 by transmitting an unlocking instruction (a permitting instruction) to the DCM 30, and in step S310, the management server 10 may cause the DCM 30 to perform a process to prohibit the start of the driving source 41 by transmitting a locking instruction (a prohibiting instruction) to the DCM 30.

Moreover, even in the case that the DCM 30 executes the start permission/prohibition process (FIG. 6), the management server 10 may execute a portion of the start permission/prohibition process (FIG. 6) as shown in the following example. As an example, a configuration in which some of steps S302, S303, and S308 are executed by the management server 10 will be described. It should be noted that the management server 10 is able to independently obtain the current time. Further, the corresponding information corresponding to the electronic key is stored in the memory 14.

For example, in step S302, the DCM 30 may request the management server 10 to perform the authentication process, and may receive the result of the authentication process (hereinafter, referred to as "an authentication result") from the management server 10. The management server 10 executes the authentication process and transmits the authentication result to the DCM 30. The DCM 30 transmits the electronic key received from the user terminal 20 to the management server 10 when requesting the authentication process. In the other process (step S106 in FIG. 4), the management server 10 executes the authentication process and a transmission process of the authentication result. The DCM 30 performs the judgment in step S302 based on the received authentication result.

Further, in step S303, the DCM 30 may request the management server 10 to perform the judgment A process, and may receive the result of the judgment A process from the management server 10. The management server 10 executes the judgment A process and transmits the result of the judgment A process to the DCM 30. The DCM 30 transmits the electronic key received from the user terminal 20 to the management server 10 when requesting the judgment A process. In the other process (step S106 in FIG. 4), the management server 10 executes the judgment A process. In step S304, the DCM 30 performs the judgment (the judgment of enabled/disabled) based on the received result of the judgment A process.

Further, in step S308, the DCM 30 may request the management server 10 to perform the judgment B process, and may receive the result of the judgment B process from the management server 10. The management server 10 executes the judgment B process and transmits the result of the judgment B process to the DCM 30. The DCM 30 transmits the electronic key and the marine vessel location that are received from the user terminal 20 to the management server 10 when requesting the judgment B process. In the other process (step S106 in FIG. 4), the management server 10 executes the judgment B process. In step S309, the DCM 30 performs the judgment (the judgment of enabled/disabled) based on the received result of the judgment B process.

In addition, in order to start the driving source 41 in a state in which the start of the driving source 41 is permitted (unlocked), it is necessary to operate the start operation portion 42. However, the rental application may be provided with a function to start the driving source 41, and the driving source 41 may be started by pressing a start button on a screen of the rental application.

Although the present invention has been described in detail based on the preferred embodiments described above, the present invention is not limited to these specific preferred embodiments, and various preferred embodiments within the scope not deviating from the gist of the present invention are also included in the present invention. Some of the above-described preferred embodiments may be combined as appropriate.

It should be noted that the present invention can also be provided by executing the following process. That is, it is the process in which software (programs) that provides the functions of the above-described preferred embodiments is supplied to a system or an apparatus via a network or various kinds of storage media, and a computer (or a CPU, an MPU (Micro Processing Unit), or the like) of the system or the apparatus reads program codes and executes them. In this case, the programs and a storage medium storing the programs constitute the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel rental system comprising:

a generator configured or programmed to generate an electronic key associated with information about a marine vessel for rent and information about a rental period in response to a request from a user terminal, and to transmit the electronic key to the user terminal;

a controller configured or programmed to permit starting of a driving source of the marine vessel for rent based on a condition that a current time belongs to the rental period corresponding to the electronic key; and an obtainer configured or programmed to obtain location information of the marine vessel; wherein when the rental period corresponding to the electronic key has ended, the controller is configured or programmed to determine whether the marine vessel is located within a predetermined area including a mooring space for the marine vessel based on the location information;

in a case that the marine vessel is located within the predetermined area, the controller is configured or programmed to prohibit the start of the driving source; and in a case that the marine vessel is located outside the predetermined area, the controller is configured or programmed to not prohibit the start of the driving source.

2. The marine vessel rental system according to claim 1, wherein, when receiving a start permission request for the driving source from the user terminal, the controller is configured or programmed to permit the start of the drive source if the current time belongs to the rental period.

3. The marine vessel rental system according to claim 1, wherein, the obtainer is configured or programmed to obtain the location information of the marine vessel when the rental period corresponding to the electronic key has ended.

4. The marine vessel rental system according to claim 1, further comprising:

an unlocking processor configured or programmed to permit or prohibit unlocking of a marina or a pier that includes the mooring space for the marine vessel based on the rental period corresponding to the electronic key in response to receiving an unlocking request for the marina or the pier from the user terminal.

5. The marine vessel rental system according to claim 4, wherein, the unlocking processor is configured or programmed to permit the unlocking of the marina or the pier during a predetermined time period before a start time of the rental period.

6. The marine vessel rental system according to claim 4, wherein, the electronic key is associated with a function that requests unlocking of a cabin of the marine vessel, unlocking of a hatch of the marine vessel, unlocking of a storage compartment within the marine vessel, and/or unlocking of a storage compartment within the marina.

7. The marine vessel rental system according to claim 1, wherein, the generator is configured or programmed to generate another electronic key that restricts use of some functions of the marine vessel, and to transmit the generated another electronic key to a predetermined terminal device different from the user terminal.

8. The marine vessel rental system according to claim 7, wherein, in the another electronic key, a maximum output of the driving source is limited to a predetermined output.

9. The marine vessel rental system according to claim 1, wherein, even in the case that the rental period corresponding to the electronic key has ended and the location information indicates that the marine vessel is located within the predetermined area, the controller is configured or programmed not to prohibit the start of the driving source while the driving source continues to be in operation.

10. The marine vessel rental system according to claim 1, wherein the controller and the obtainer are provided on the marine vessel; and the generator is provided in a server that is able to communicate with the controller.

11. A marine vessel rental system comprising:

a controller configured or programmed to permit starting of a driving source of a marine vessel for rent based on a condition that a current time belongs to a rental period corresponding to an electronic key associated with information about the marine vessel for rent and information about the rental period, in which the electronic key is stored in a user terminal; and an obtainer configured or programmed to obtain location information of the marine vessel; wherein when the rental period corresponding to the electronic key has ended, the controller is configured or programmed to determine whether the marine vessel is located within a predetermined area including a mooring space for the marine vessel based on the location information;

in a case that the marine vessel is located within the predetermined area, the controller is configured or programmed to prohibit the start of the driving source; and in a case that the marine vessel is located outside the predetermined area, the controller is configured or programmed to not prohibit the start of the driving source.

12. A marine vessel rental method carried out by at least one computer, the method comprising:

generating an electronic key, which is associated with information about a marine vessel being a rental target and information about a rental period in response to a request from a user terminal, and transmitting the electronic key to the user terminal;

permitting start of a driving source for navigating the marine vessel for rent based on a condition that a current time belongs to the rental period corresponding to the electronic key;

obtaining location information of the marine vessel;

determining whether the marine vessel is located within a predetermined area including a mooring space for the marine vessel based on the location information when the rental period corresponding to the electronic key has ended; and prohibiting the start of the driving source in a case that the marine vessel is located within the predetermined area, and not prohibiting the start of the driving source in a case that the marine vessel is located outside the predetermined area.

13. A marine vessel rental method carried out by at least one computer, the method comprising:

permitting starting of a driving source of a marine vessel for rent based on a condition that a current time belongs to a rental period corresponding to an electronic key associated with information about the marine vessel for rent and information about the rental period, in which the electronic key is stored in a user terminal;

obtaining location information of the marine vessel;

determining whether the marine vessel is located within a predetermined area including a mooring space for the marine vessel based on the location information when the rental period corresponding to the electronic key has ended; and prohibiting the start of the driving source in a case that the marine vessel is located within the predetermined area, and not prohibiting the start of the driving source in a case that the marine vessel is located outside the predetermined area.

* * * * *